(12) United States Patent
Nelson et al.

(10) Patent No.: US 11,846,504 B2
(45) Date of Patent: *Dec. 19, 2023

(54) TAPE MEASURE WITH COMPACT RETRACTION SYSTEM

(71) Applicant: Milwaukee Electric Tool Corporation, Brookfield, WI (US)

(72) Inventors: Collin J. Nelson, Milwaukee, WI (US); David Andrew Wortelboer, Milwaukee, WI (US); Kyle C. Anderson, Wauwatosa, WI (US); Abhijeet A. Khangar, Pewaukee, WI (US); Jonathan F. Vitas, Muskego, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,910

(22) Filed: Oct. 4, 2022

(65) Prior Publication Data

US 2023/0040277 A1 Feb. 9, 2023

Related U.S. Application Data

(63) Continuation of application No. 17/129,348, filed on Dec. 21, 2020, now Pat. No. 11,466,970, which is a
(Continued)

(51) Int. Cl.
*G01B 3/1005* (2020.01)
*G01B 3/1041* (2020.01)

(52) U.S. Cl.
CPC ......... *G01B 3/1005* (2013.01); *G01B 3/1041* (2013.01); *H05K 999/99* (2013.01); *G01B 2003/103* (2013.01)

(58) Field of Classification Search
CPC ............... G01B 3/1005; G01B 3/1041; G01B 2003/103; G01B 3/1043; G01B 2003/1023; H05K 999/99; F03G 1/02; F03G 1/08
See application file for complete search history.

(56) References Cited

U.S. PATENT DOCUMENTS

| 1,057,543 A | 4/1913 | Green |
| 1,110,759 A | 9/1914 | Earll |
(Continued)

FOREIGN PATENT DOCUMENTS

| CN | 87206970 | 12/1987 |
| CN | 2092740 | 1/1992 |
(Continued)

OTHER PUBLICATIONS

DeWalt website material, 100 ft Auto Retractable Long Tape, available at http://www.dewalt.com/en-us/products/hand-tools/measuring-and-layout-tools/100-ft-auto-retractable-long-tape/dwht34201, illustrating products publicly available at least by Sep. 20, 2017, 2 pages.
(Continued)

*Primary Examiner* — Yaritza Guadalupe-McCall
(74) *Attorney, Agent, or Firm* — Reinhart Boerner Van Deuren s.c.

(57) ABSTRACT

A tool, such as a tape measure, including a spring-based retraction system is shown. Various spring-based retraction system embodiments are configured to decrease the size occupied by the spring within the tape measure housing, which consequently reduces tape measure housing size providing a more compact tape measure. Various spring-based retraction system embodiments are configured to control retraction of the tape measure in a manner that reduces whip or otherwise controls tape blade retraction. Some retraction system embodiments utilize a reduction
(Continued)

gear train, and others utilize a compression spring and a transmission system that converts rotational movement of the tape reel to axial movement, which compresses the spring.

17 Claims, 7 Drawing Sheets

Related U.S. Application Data continuation of application No. 16/573,712, filed on Sep. 17, 2019, now Pat. No. 10,876,825, which is a continuation of application No. 16/168,286, filed on Oct. 23, 2018, now Pat. No. 10,458,771, which is a continuation of application No. 15/845,870, filed on Dec. 18, 2017, now Pat. No. 10,132,605, which is a continuation of application No. 15/782,978, filed on Oct. 13, 2017, now Pat. No. 9,874,428, which is a continuation of application No. PCT/US2017/055166, filed on Oct. 4, 2017.

(60) Provisional application No. 62/404,635, filed on Oct. 5, 2016.

(56) References Cited

U.S. PATENT DOCUMENTS

| | | | |
|---|---|---|---|
| 1,119,887 A | 12/1914 | Shanahan | |
| 1,203,562 A | 11/1916 | Adamson | |
| 2,437,786 A | 9/1945 | Oberdorf et al. | |
| 2,543,176 A | 2/1951 | Komassa | |
| 3,054,573 A | 9/1962 | Spencer | |
| 3,812,589 A | 5/1974 | Schultheis | |
| 3,929,210 A | 12/1975 | Cutler et al. | |
| 4,026,494 A | 5/1977 | Tanaka | |
| 4,113,200 A | 9/1978 | Tanaka | |
| 4,189,107 A | 2/1980 | Maso | |
| 4,205,808 A | 6/1980 | Hurtig et al. | |
| 4,303,208 A | 12/1981 | Tanaka | |
| 4,402,472 A | 9/1983 | Burtscher | |
| 4,756,087 A | 7/1988 | Sing | |
| 5,042,159 A | 8/1991 | Millen | |
| 5,440,820 A | 8/1995 | Hwang | |
| 5,448,837 A | 9/1995 | Han-Teng | |
| 5,471,761 A | 12/1995 | Cheng | |
| 5,820,057 A | 10/1998 | Decarolis et al. | |
| 5,875,987 A | 3/1999 | Pullen | |
| 6,134,801 A | 10/2000 | Miyasaka | |
| 6,295,740 B1 | 10/2001 | Mitchell | |
| 6,349,482 B1 | 2/2002 | Gilliam | |
| 6,464,160 B2 | 10/2002 | Hsu | |
| 6,550,155 B1 | 4/2003 | Hsu | |
| 6,868,620 B2 | 3/2005 | Sanoner | |
| 7,024,790 B1 | 4/2006 | Qilian | |
| 7,096,596 B2 | 8/2006 | Hernandez et al. | |
| 7,263,784 B1 | 9/2007 | Lee | |
| 7,293,367 B1 | 11/2007 | Zhu | |
| 7,374,125 B2 | 5/2008 | Lin | |
| 7,398,604 B2 | 7/2008 | Murray | |
| 7,584,549 B2 | 9/2009 | Lee et al. | |
| 8,117,763 B2 | 2/2012 | Delneo et al. | |
| 8,584,373 B2 | 11/2013 | Murray et al. | |
| 9,207,058 B2 | 12/2015 | Delneo et al. | |
| 9,874,428 B1* | 1/2018 | Nelson | G01B 3/1005 |
| 10,132,605 B2* | 11/2018 | Nelson | H05K 999/99 |
| 10,458,771 B2* | 10/2019 | Nelson | G01B 3/1041 |
| 10,836,603 B2* | 11/2020 | Vitas | G01B 3/1041 |
| 10,876,825 B2* | 12/2020 | Nelson | H05K 999/99 |
| 11,226,187 B2* | 1/2022 | Vitas | G01B 3/1005 |
| 11,466,970 B2* | 10/2022 | Nelson | G01B 3/1005 |
| 2001/0038055 A1 | 11/2001 | Hsu | |
| 2004/0035017 A1 | 2/2004 | Yang | |
| 2004/0035971 A1 | 2/2004 | Li | |
| 2006/0096113 A1 | 5/2006 | Kang et al. | |
| 2006/0254070 A1 | 11/2006 | Huang | |
| 2007/0186433 A1 | 8/2007 | Campbell | |
| 2008/0086904 A1 | 4/2008 | Murray | |
| 2010/0212175 A1 | 10/2010 | Choi | |
| 2011/0179661 A1 | 7/2011 | Delneo et al. | |
| 2015/0247716 A1 | 9/2015 | Craig et al. | |
| 2016/0076866 A1 | 3/2016 | Chiu | |
| 2016/0290776 A1 | 10/2016 | Hoppe et al. | |
| 2018/0106585 A1* | 4/2018 | Nelson | H05K 999/99 |
| 2018/0334354 A1 | 11/2018 | Orsini et al. | |
| 2019/0056207 A1* | 2/2019 | Nelson | H05K 999/99 |
| 2020/0011648 A1* | 1/2020 | Nelson | H05K 999/99 |
| 2020/0033108 A1* | 1/2020 | Vitas | G01B 3/1005 |
| 2021/0108907 A1* | 4/2021 | Nelson | G01B 3/1005 |
| 2023/0040277 A1* | 2/2023 | Nelson | G01B 3/1043 |

FOREIGN PATENT DOCUMENTS

| | | |
|---|---|---|
| CN | 2247326 | 2/1997 |
| CN | 1181496 | 5/1998 |
| CN | 2314340 | 4/1999 |
| CN | 2344751 | 10/1999 |
| CN | 2356309 | 12/1999 |
| CN | 2356310 | 12/1999 |
| CN | 2370385 | 3/2000 |
| CN | 2374839 | 4/2000 |
| CN | 2374840 | 4/2000 |
| CN | 2462345 | 11/2001 |
| CN | 2475990 | 2/2002 |
| CN | 2485625 | 4/2002 |
| CN | 2536986 | 2/2003 |
| CN | 1461938 | 12/2003 |
| CN | 2606327 | 3/2004 |
| CN | 1546939 | 11/2004 |
| CN | 1185459 | 1/2005 |
| CN | 2718508 | 8/2005 |
| CN | 2859447 | 1/2007 |
| CN | 2884130 | 3/2007 |
| CN | 1991292 A | 7/2007 |
| CN | 101004345 | 7/2007 |
| CN | 200968838 | 10/2007 |
| CN | 200996820 | 12/2007 |
| CN | 201014950 | 1/2008 |
| CN | 201021887 | 2/2008 |
| CN | 101165452 | 4/2008 |
| CN | 101173846 | 5/2008 |
| CN | 201083476 | 7/2008 |
| CN | 201096485 | 8/2008 |
| CN | 101358826 | 2/2009 |
| CN | 101424504 | 5/2009 |
| CN | 100520273 | 7/2009 |
| CN | 201285261 | 8/2009 |
| CN | 101655340 | 2/2010 |
| CN | 101676678 | 3/2010 |
| CN | 201520567 | 7/2010 |
| CN | 201532159 | 7/2010 |
| CN | 201540069 | 8/2010 |
| CN | 201637362 | 11/2010 |
| CN | 101644556 | 5/2011 |
| CN | 102829681 | 12/2012 |
| CN | 102901415 | 1/2013 |
| CN | 102901416 | 1/2013 |
| CN | 202660994 | 1/2013 |
| CN | 203148328 | 8/2013 |
| CN | 203240971 | 10/2013 |
| CN | 203310318 | 11/2013 |
| CN | 103673803 | 3/2014 |
| CN | 203586971 | 5/2014 |
| CN | 203928924 | 11/2014 |
| CN | 203928926 | 11/2014 |
| CN | 203976134 | 12/2014 |
| CN | 204142110 | 2/2015 |
| CN | 204268991 | 4/2015 |
| CN | 105004231 | 10/2015 |
| CN | 105066805 | 11/2015 |
| CN | 105222661 | 1/2016 |
| CN | 204944336 | 1/2016 |
| CN | 204963699 | 1/2016 |

(56) References Cited

FOREIGN PATENT DOCUMENTS

| | | |
|---|---|---|
| CN | 105318795 | 2/2016 |
| CN | 205403630 | 7/2016 |
| CN | 205403635 | 7/2016 |
| CN | 105856165 | 8/2016 |
| CN | 205426006 | 8/2016 |
| CN | 205879028 | 1/2017 |
| CN | 206488711 | 9/2017 |
| DE | 10311105 A1 | 9/2004 |
| DE | 10306340 | 12/2004 |
| DE | 10319907 | 4/2005 |
| EP | 0022230 | 5/1984 |
| EP | 1044350 | 10/2000 |
| EP | 1074813 | 2/2001 |
| JP | H04-1402 | 1/1992 |
| JP | H06-2102 | 1/1994 |
| JP | H06-28602 | 4/1994 |
| JP | H07301501 | 11/1995 |
| JP | 2011-032927 A | 2/2011 |
| KR | 1999-0013614 U | 4/1999 |
| KR | 20-0279487 | 6/2002 |
| KR | 10-1315057 | 10/2013 |
| TW | 200606400 A | 2/2006 |
| TW | M298110 | 9/2006 |
| TW | 200831851 A | 8/2008 |
| TW | 200848697 A | 12/2008 |
| TW | 200905161 A | 2/2009 |
| TW | 201812242 A | 4/2018 |
| WO | WO9714541 | 4/1997 |
| WO | WO9923447 | 5/1999 |
| WO | WO03010485 | 2/2003 |
| WO | WO03074235 | 9/2003 |
| WO | WO03085353 | 10/2003 |
| WO | WO03096839 | 11/2003 |
| WO | WO04037348 | 5/2004 |
| WO | WO04056269 | 7/2004 |
| WO | WO05085747 | 9/2005 |
| WO | WO05108909 | 11/2005 |
| WO | WO07059353 | 5/2007 |
| WO | WO08083416 | 7/2008 |
| WO | WO08141614 | 11/2008 |
| WO | WO08145101 | 12/2008 |
| WO | WO09110879 | 9/2009 |
| WO | WO11047440 | 4/2011 |
| WO | WO12082034 | 6/2012 |
| WO | WO12142102 | 10/2012 |
| WO | WO15194841 | 12/2015 |
| WO | WO16148504 | 9/2016 |
| WO | WO16161452 | 10/2016 |
| WO | WO16164725 | 10/2016 |

OTHER PUBLICATIONS

DeWalt website material, 100 ft. Steel Auto-Rewind Long Tape, available at http://www.homedepot.com/p/DEWALT-1OD-ft-Steel-Auto-Rewind-Long-Tape-DWHT34201/202710450?keyword=DWHT34201, illustrating products publicly available at least by Sep. 20, 2017, 3 pages.

Extended European Search Report for European Application No. 17859126.9, dated May 11, 2020, 21 pages.

International Search Report and Written Opinion for International Application No. PCT/US2017/055166 dated Jan. 22, 2018, 47 pages.

International Search Report and Written Opinion for International Application No. PCT/US2018/023391 dated Jul. 10, 2018, 12 pages.

\* cited by examiner

TAPE MEASURE WITH COMPACT RETRACTION SYSTEM

CROSS-REFERENCE TO RELATED PATENT APPLICATIONS

The present application is a continuation of U.S. application Ser. No. 17/129,348, filed on Dec. 21, 2020, which is a continuation of U.S. application Ser. No. 16/573,712, filed on Sep. 17, 2019, now U.S. Pat. No. 10,876,825, which is a continuation of U.S. application Ser. No. 16/168,286, filed on Oct. 23, 2018, now U.S. Pat. No. 10,458,771, which is a continuation of U.S. application Ser. No. 15/845,870, filed on Dec. 18, 2017, now U.S. Pat. No. 10,132,605, which is a continuation of U.S. application Ser. No. 15/782,978, filed on Oct. 13, 2017, now U.S. Pat. No. 9,874,428, which is a continuation of International Application No. PCT/US2017/055166, filed on Oct. 4, 2017, which claims the benefit of and priority to U.S. Provisional Application No. 62/404,635, filed on Oct. 5, 2016, which are incorporated herein by reference in their entireties.

BACKGROUND OF THE INVENTION

The present invention relates generally to the field of tools. The present invention relates specifically to a tape measure, measuring tape, retractable rule, etc., that includes a compact spring retraction system.

SUMMARY OF THE INVENTION

One embodiment of the invention relates to a tape measure including a spring based retraction system. The tape measure includes a tape reel and a measuring tape wound on the tape reel. A spring is coupled to the tape blade or tape reel so that the spring stores energy during extension of the tape blade out of the tape measure housing and releases energy to drive tape blade uptake onto the tape reel during tape retraction.

In one embodiment, the tape measure includes a gear train rotatably coupling the tape reel to the spring. In a specific embodiment, the spring is a spiral spring coupled to a post (e.g., a central post, axle, etc.) such that the spiral spring is wound around the post during tape extension. In some such embodiments, the gear train is configured to provide gear reduction between the tape reel and the spring such that the number of rotations the spring experiences during winding is less than the number of rotations experienced by the tape reel during tape extension. In various embodiments, the gear reduction is greater than 2 to 1, and more specifically is at least 3 to 1. In specific embodiments, the gear reduction allows for a lower spring length (and a lower maximum diameter in the case of spiral springs) to achieve a given spring torque level as compared to conventional tape measures without gear reduction.

In various embodiments, the gear train is a planetary gear train, and the planetary gear train includes a central ("sun") gear rigidly coupled to the tape reel, a ring gear rigidly coupled to a spring spool surrounding the spiral spring, such that the ring gear rotates with the spring spool, a gear carrier rigidly fixed to the central post, and at least two planet gears supported by the gear carrier such that rotational motion is translated between the tape reel and the spring spool. In specific embodiments, the gear carrier and planetary gears are located within and surrounded by at least one of the tape reel and the spring spool. In specific embodiments, the sun gear and ring gear surround and are coaxial with at least one of the central post, the spring spool and/or the tape reel. In specific embodiments, the planetary gears are spaced around and equidistance from the central post.

In another embodiment, the spring is a spiral spring positioned to wind around a spring axis, and the spiral spring is located outside of the tape reel at a position such that the spring axis is non-parallel to a rotational axis of the tape reel. In a specific embodiment, the spring axis is perpendicular to the rotational axis of the tape reel. In various embodiments, the tape measure includes a gear train that changes direction of rotational movement of the tape reel in order to drive rotation of the spiral spring about the spring axis. In a specific embodiment, the gear train includes a first bevel gear engaging the tape reel, and a second bevel gear perpendicular to the first bevel gear. In such embodiments, the second bevel gear is driven by the first bevel gear during tape extension to rotate about the spring axis, and the second bevel gear is coupled to the spiral spring.

In another embodiment, the spring is a compression spring, and the tape measure includes a transmission system coupled between the tape reel and the compression spring. The transmission system converts rotational motion of the tape reel to non-rotational (e.g., axial) compression of the compression spring. In one embodiment, the compression spring is located within the tape reel and surrounds a central axis of the tape reel, and the transmission system includes a plate contacting an end of the compression spring. Rotation of the tape reel causes the plate to translate in a direction along the central axis causing compression of the compression spring. In a specific embodiment, the plate includes gear teeth along its outer edge that engage cooperating gear teeth formed along the inner surface of the tape reel, and the plate also includes a threaded central opening that engages cooperating threads along a central post. In a specific embodiment, the central post is co-axial with the compression spring and the tape reel. In another embodiment, the plate includes a helical thread formed along an outer peripheral edge of the plate, and an inner surface of the tape spool includes a helically threaded surface that engages the helical thread of the plate.

Another embodiment relates to a tape measure. The tape measure includes a housing, a shaft coupled to the housing, a tape reel rotatably mounted within the housing around the shaft, and the tape reel includes a radially outward facing surface and a radially inward facing surface defining an interior reel cavity. The tape measure includes an elongate tape blade wound around the radially outward facing surface of the tape reel, and the elongate tape blade has an upper surface with a concave profile when extended from the housing. The tape measure includes a spiral spring located at least partially within the interior reel cavity and at least partially surrounded by the elongate tape blade in the radial direction. The spiral spring is coupled between the tape reel and the shaft such that when the elongate tape blade is unwound from the tape reel to extend from the housing the spiral spring stores energy and the spiral spring releases energy driving rewinding of the elongate tape blade on to the tape reel. The tape measure includes a reduction gear train rotatably coupling the spiral spring to the tape reel such that, during extension of the elongate tape blade from the housing, each full rotation of the tape reel is translated into less than a full rotation of the spring. The tape measure includes a hook assembly coupled to an outer end of the elongate tape blade.

Another embodiment relates to a tape measure. The tape measure includes a housing and a tape reel rotatably mounted within the housing. The tape reel includes a radially outward facing surface and a radially inward facing surface defining an interior reel cavity. The tape measure includes an elongate tape blade wound around the radially outward facing surface of the tape reel. The elongate tape blade comprises a metal core and a coating layer, and the metal core has an average cross-sectional area, TA. The tape measure includes a spring coupled to the tape reel such that when the elongate tape blade is unwound from the tape reel to extend from the housing the spring stores energy and the spring releases energy driving rewinding of the elongate tape blade on to the tape reel. The spring has an average cross-sectional area, SA, wherein TA/SA is less than 0.9.

Another embodiment relates to a tape measure. The tape measure includes a housing, a tape reel rotatably mounted within the housing, and the tape reel includes a radially outward facing surface and a radially inward facing surface defining an interior reel cavity. The tape measure includes an elongate tape blade wound around the radially outward facing surface of the tape reel, wherein the elongate tape blade has a maximum extended length, TL. The tape measure includes a spring coupled to the tape reel such that, when the elongate tape blade is unwound from the tape reel to extend from the housing, the spring stores energy and the spring releases energy driving rewinding of the elongate tape blade on to the tape reel. The tape measure includes a total spiral spring length, SL, and TL/SL is greater than 2.52.

Another embodiment relates to a tape measure. The tape measure includes a housing, and a tape reel rotatably mounted within the housing. The tape reel includes a radially outward facing surface and a radially inward facing surface defining an interior reel cavity. The tape reel includes a reel area, RA, located within the radially outward facing surface of the tape reel. The tape measure includes an elongate tape blade wound around the radially outward facing surface of the tape reel, and the elongate tape blade has a maximum extended length, TL. TL/RA is greater than 6.6.

Another embodiment relates to a tape measure including a housing, a shaft, and a tape reel rotatably mounted within the housing around the shaft. The tape reel includes a radially outward facing surface and a radially inward facing surface defining an interior reel cavity. The tape measure includes an elongate tape blade wound around the radially outward facing surface of the tape reel. The tape measure includes spiral spring coupled between the tape reel and the shaft such that, when the elongate tape blade is unwound from the tape reel to extend from the housing, the spring stores energy and the spiral spring releases energy driving rewinding of the elongate tape blade on to the tape reel. The tape measure includes a turn differential mechanism rotatably coupling the spiral spring to the tape reel such that, during extension of the elongate tape blade from the housing, each full rotation of the tape reel is translated into less than a full rotation of the spring. The tape measure is in a retracted state when a maximum amount of the elongate tape blade is wound around the radially outward facing surface of the tape reel, and the tape measure is in an extended state when a minimum amount of the elongate tape blade is wound around the radially outward facing surface of the tape reel. The tape reel rotates in a first direction a number of times from the retracted state to the extended state, Tape Reel Turns, wherein a first end of the spiral spring rotates about the shaft a number of times, Spring Turns, and wherein Tape Reel Turns/Spring Turns is greater than 0.94.

Another embodiment relates to a tape measure including a housing, a shaft, a tape reel rotatably mounted within the housing around the shaft. The tape reel includes a radially outward facing surface and a radially inward facing surface defining an interior reel cavity. The tape reel includes an elongate tape blade wound around the radially outward facing surface of the tape reel, and the elongate tape blade comprises a moment of inertia, MIT. The tape measure includes a spiral spring coupled between the tape reel and the shaft such that, when the elongate tape blade is unwound from the tape reel to extend from the housing, the spring stores energy and the spiral spring releases energy driving rewinding of the elongate tape blade on to the tape reel, and the spiral spring comprises a moment of inertia, MIS. The tape measure includes a turn differential mechanism rotatably coupling the spiral spring to the tape reel such that, during extension of the elongate tape blade from the housing, each full rotation of the tape reel is translated into less than a full rotation of the spring. MIT/MIS is less than 0.8.

Another embodiment relates to a tape measure including a housing, a tape reel rotatably mounted within the housing. The tape reel includes a radially outward facing surface and a radially inward facing surface defining an interior reel cavity. The tape measure includes an elongate tape blade wound around the radially outward facing surface of the tape reel. The tape measure includes a spiral spring coupled between the tape reel and the shaft such that, when the elongate tape blade is unwound from the tape reel to extend from the housing, the spring stores energy and the spiral spring releases energy driving rewinding of the elongate tape blade on to the tape reel. The tape measure includes the elongate tape blade comprises a metal core and a coating layer, and the metal core has an average thickness, TT, and the spiral spring has an average thickness, ST. TT/ST is less than 0.73.

Another embodiment relates to a tape measure includes a housing, and a tape reel rotatably mounted within the housing. The tape reel including a radially outward facing surface and a radially inward facing surface defining an interior reel cavity. The tape measure includes an elongate tape blade wound around the radially outward facing surface of the tape reel. The tape measure includes the tape reel comprises a diameter, D, measured across the radially outward facing surface of the tape reel, wherein the elongate tape blade has a total maximum extended length of TL, wherein TL/D is greater than 237.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are illustrative.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Figure 1:
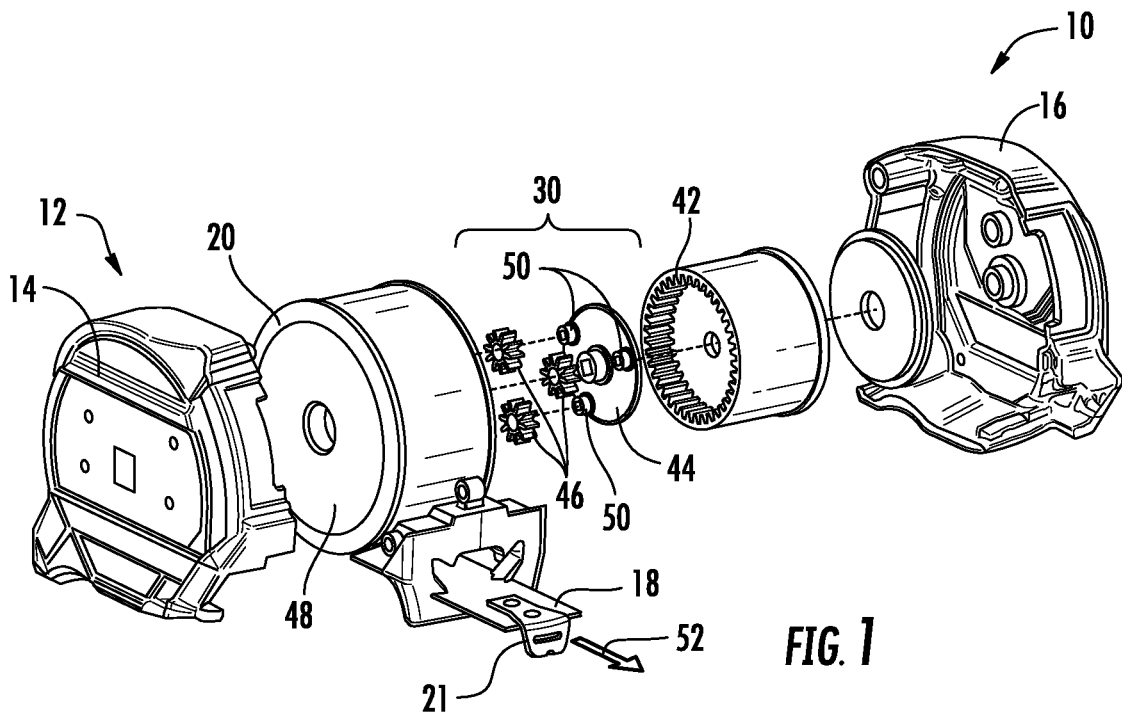
FIG. 1 is a first exploded view of a tape measure, according to an illustrative embodiment.

Referring generally to the figures, various embodiments of a tape measure are shown. Various embodiments of the tape measure discussed herein include an innovative retraction system designed to provide for a variety of desired retraction characteristics, including controlled retraction speed, reducing the amount of whip experienced during blade retraction (e.g., the tendency of the tape measure blade to bend or snap back on itself during fast retraction), and/or providing a retraction system that allows for a more compact tape measure without sacrificing tape length or retraction performance.

As will generally be understood, in certain tape measure designs, a spring stores energy during tape blade extension, and applies force to a reel causing the tape blade to wind on to a reel during tape blade retraction. Various aspects of spring design, such as spring energy, torque profile, spring constant, etc., are selected to ensure that operation of the spring causes satisfactory level of tape retraction. In such tape measures, the spring design is a function of a variety of parameters that relate to retraction of the tape measure blade, including tape measure blade width, length, shape and material, friction within the tape measure spool/retraction system, mechanical efficiency of translation of spring energy to tape blade retraction, the desired speed/acceleration of the tape measure blade during retraction, etc. Thus, for a given set of tape measure mechanical parameters and a given desired retraction speed/acceleration, the spring system within the tape measure needs to store and release a given amount of energy during tape retraction.

In typical tape measure designs, a spiral spring is used to provide the retraction energy, and in such designs, spiral spring length, width and/or thickness are the typical spring parameters adjusted to provide more or less retraction energy as needed for particular designs. For example, in such conventional tape measures, a thicker spiral spring is typically used to generate retraction force needed for a longer tape measure blade, a heavier tape measure blade, a faster retraction speed, wider tape blades, blades with deeper curvature, etc. As discussed herein, Applicant has developed various innovative tape measure blade retraction systems that provide a desired level of spring energy while utilizing a relatively short or small volume spring, while maintaining a relatively small tape measure housing (e.g., a tape measure outer diameter), and/or while providing desired retraction characteristics. In some instances, having a smaller outside diameter of the spooled blade on the reel is favorable over a larger outside blade diameter because the housing of the tape measure can be reduced accordingly. A smaller housing is generally favorable to fit comfortably within a user's hand.

In such embodiments, the spring is configured to deliver high levels of torque despite its small size, allowing for a relatively small sized spring to cause retraction of a relatively long tape blade. Thus, Applicant's tape measure designs discussed herein are believed to allow for highly compact tape measures (for a given tape length) not achieved in prior designs. In such embodiments, the high torque and compact spring is generally thicker, shorter, wider, has a higher cross-sectional area and/or occupies a smaller space within the tape measure for a given tape length than believed achievable with prior designs.

Some prior tape designs use multiple spiral springs coupled in series to achieve a compact design. However, in such designs, while diameter of the spring area of the tape measure is decreased, total amount of spring length is still relatively high and simply shifted in the width direction and the width of the spring cavity is increased. Accordingly, in some embodiments, the tape measure discussed herein achieves a highly compact tape measure utilizing a single spiral spring, and in at least some embodiments, Applicant believes that such designs improve various measurements of compactness (e.g., ratio of tape length to spring length, ratio of tape metal thickness to spring thickness, ratio of tape metal cross-sectional area to spring cross-sectional area, ratio of tape steel moment of inertia to spring moment of inertia, tape length to tape reel diameter, tape length to tape reel area, ratio of tape reel turns to spring turns, etc.) even compared to such multi-spring tape measure designs. In alternative embodiments, multiple spiral springs (e.g., in series and/or in parallel) can be used.

In a specific embodiment, the tape measure discussed herein utilizes a high torque, compact spiral spring and includes a turn reduction mechanism (e.g., a reduction gear train) located between a tape reel and the spiral spring that results in a highly compact tape measure not achieved in prior tape measure designs. In such embodiments, the reduction gear train decreases the number of rotations the spiral spring experiences for every rotation of the tape reel upon tape extension. In such embodiments, the spiral spring of the tape measure embodiments discussed herein utilizes spring width, thickness, material, etc. rather than spring length to generate a given torque level/energy level needed to provide a particular level of retraction speed, acceleration, etc., as desired for a particular length/size of measuring tape. By decreasing spring length, the size/diameter of the space occupied by the spring within the tape measure can be reduced (i.e., an increase in energy density), which in turn provides a highly compact tape measure, for a given tape length.

Further, in contrast to some prior tape designs that utilize gearing (e.g., long-length, greater than 50 ft. long, flat tapes, crank-based manual retraction tapes, etc.), the compact designs discussed herein are provided in tape measures having highly robust, high standout, concave/convex metal tape blades, in at least some embodiments. Similarly, in comparison to some such prior geared tape measures, the metal tape blades discussed herein are relatively wide, allowing for good number/indicia readability and standout, and further may be equipped with a robust hook assembly fixed to the end of the metal tape blade. As such, Applicant believes that prior tape measure designs were unable to achieve the high levels of compactness in a self-retracting tape measure utilizing this type of metal blade.

In another embodiment, the tape measure includes a compression spring (e.g., a helical compression spring, a wave spring, etc.) and a transmission system for converting rotational movement of the tape reel to spring compression. In such embodiments, the compression spring may be positioned within the tape measure housing in a way that allows a desired level of energy to be stored within the spring while also reducing total tape measure size (e.g., as compared to a standard spiral spring design). In such embodiments, a component of the tape measure, such as a central post or inner surface of the tape reel, includes threading which translates rotational movement of the tape reel to translational or axial movement of a plate which compresses the compression spring during tape retraction.

Figure 10:
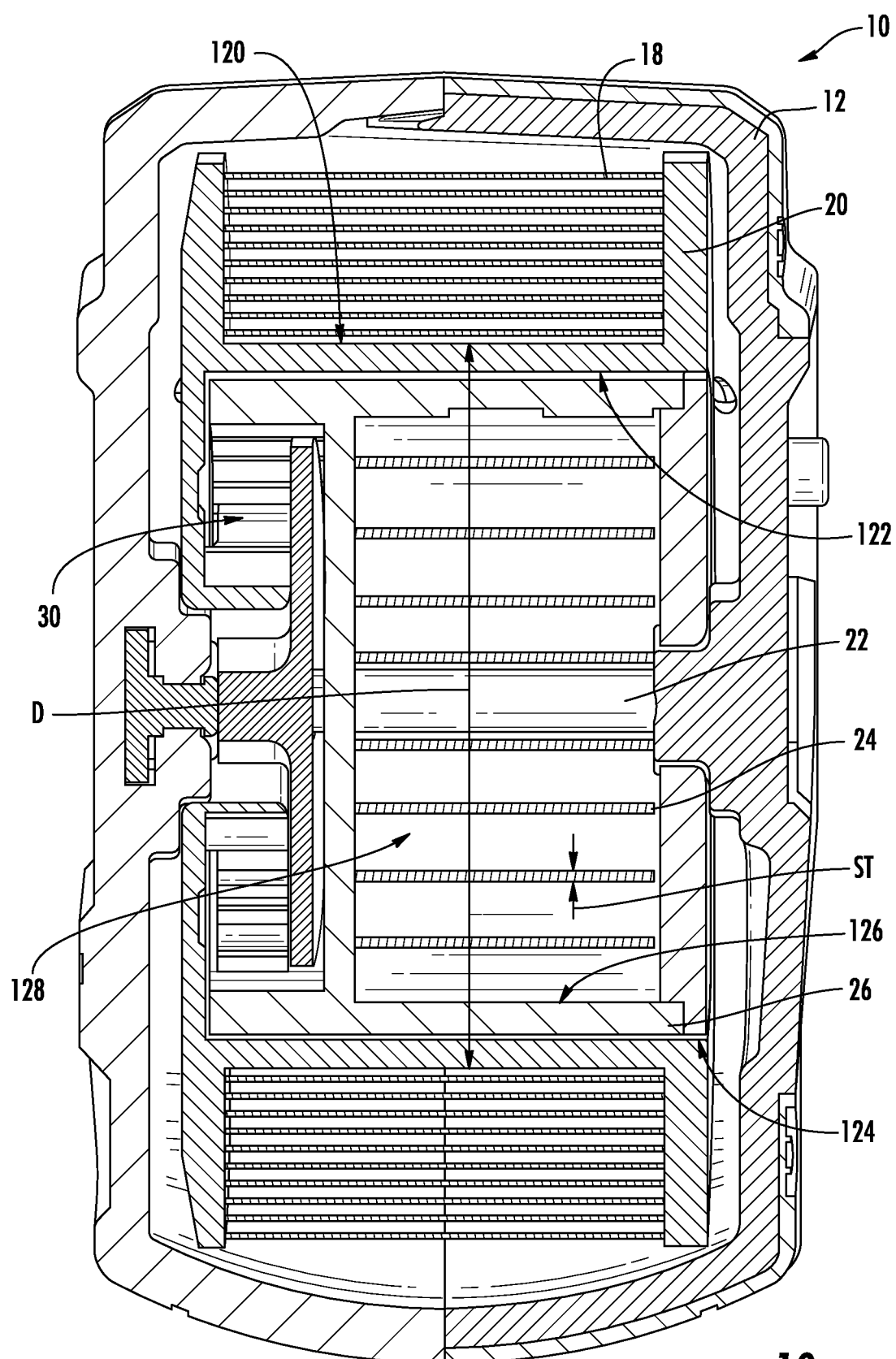
FIG. 10 is a cross-sectional view of the tape measure of FIG. 1, according to an illustrative embodiment.
Figure 11:
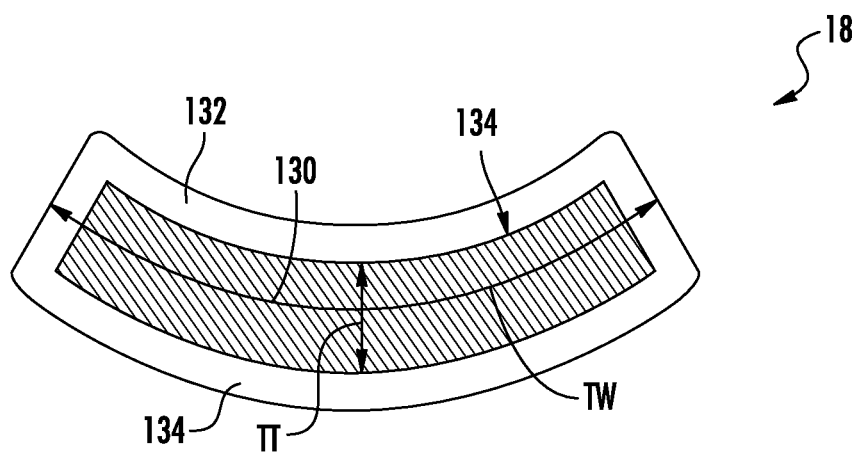
FIG. 11 is a cross-sectional view of the tape blade of the tape measure of FIG. 1, according to an illustrative embodiment.

Referring to FIGS. 1, 2, 10 and 11, a tape measure, measuring tape, retractable rule, etc., such as tape measure 10, is shown according to an illustrative embodiment. In general, tape measure 10 includes a housing 12 having a first part 14 and a second part 16. Tape measure 10 includes a tape blade 18, and in the retracted position shown in FIGS. 1 and 2, tape blade 18 is wound or coiled onto a tape reel 20. In general, tape blade 18 is an elongate strip of material including a plurality of graduated measurement markings, and in specific embodiments, tape blade 18 is an elongate strip of metal material (e.g., steel material) that includes an outer most end coupled to a hook assembly 21. Tape blade 18 also has a concave/convex profile as shown in FIG. 11 that improves standout/rigidity. As will generally be understood, tape blade 18 has the concave/convex profile when extended from housing 12, but a generally flat profile/shape when wound around reel 20.

In various embodiments, housing 12 can be a clam shell housing. As shown in FIG. 1, housing 12 includes an opening that allows tape blade 18 to enter and exit housing. In various embodiments, tape measure 10 includes a locking mechanism, such as a slide lock or auto lock, that locks tape blade 18 at a desired extended position as desired by the user.

In general, tape reel 20 is rotatably mounted to shaft, shown as an axle or post 22, that is supported from housing 12. In one embodiment, post 22 is rigidly connected (e.g., rotationally fixed) relative to housing 12, and in another embodiment, post 22 is rotatably connected to housing 12 such that post 22 is allowed to rotate relative to housing 12 during tape extension or retraction.

Tape measure 10 includes a spring, shown as spiral spring 24. In general, spiral spring 24 is coupled between post 22 and tape 18 (or tape reel 20) such that spiral spring 24 is coiled or wound to store energy during extension of tape 18 and is unwound, releasing energy driving rewinding of tape 18 onto tape reel 20 during retraction of tape 18. In specific embodiments, spiral spring 24 is mounted within a spring spool 26, and as explained in more detail below, spring spool 26 includes a toothed section that acts as a portion of a reduction gear train. In embodiments utilizing spring spool 26, an inner end of spring 24 is coupled to post 22, and an outer end of spring 24 is directly coupled to spring spool 26. In such embodiments, spring 24 is coupled to tape reel 20 via the connection to spring spool 26 and the gear train as discussed below. In a specific embodiment, tape measure 10 includes only a spiral spring located within a spring spool. In another embodiment, tape measure 10 includes two or more spiral springs for driving tape retraction.

As shown best in FIG. 1, in one embodiment, tape measure 10 includes a reduction gear train, shown as epicyclic or planetary gear train 30, that is coupled between tape reel 20 and spiral spring 24. In such embodiments and as will be discussed in more detail below, gear train 30 allows for tape measure 10 to be more compact (as measured by the various compactness measurements discussed herein) than believed to be achieved with prior tape measure designs. In general, the reduction gear train of tape measure 10 provides gear reduction between tape reel 20 and spiral spring 24 such that for each rotation of tape reel 20 (e.g., during tape extension), spiral spring 24 experiences less than one rotation of winding. In specific embodiments, the gear reduction provided by gear train 30 is at least 1.5 to 1, specifically is at least 2 to 1, more specifically is at least 3 to 1, and more specifically is between 1.8 to 1 and 9 to 1.

In a specific embodiment, tape measure 10 is in a retracted state when a maximum amount of the tape blade 18 is wound around the radially outward facing surface of the tape reel 20. Tape measure 10 is in an extended state when a minimum amount of tape blade 18 is wound around the radially outward facing surface of the tape reel 20. The tape reel rotates in a first direction a number of times from the retracted state to the extended state, Tape Reel Turns. A first end of the spiral spring rotates about the post 22 a number of times between a fully relaxed state in which the spring 24 imparts no torque between the post 22 and the spring spool 26 (i.e., the spring 24 is not preloaded) and the fully retracted state, Spring Turns. In various embodiments the ratio of these turns, Tape Reel Turns/Spring Turns is greater than 0.94. In various embodiments, Tape Reel Turns/Spring Turns is greater than 1.0. In various embodiments, Tape Reel Turns/Spring Turns is greater than 1.7. In various embodiments, Tape Reel Turns/Spring Turns is greater than 1.8. In various embodiments, Tape Reel Turns/Spring Turns is greater than 1.9. In various embodiments, Tape Reel Turns/Spring Turns is greater than 2.0. In various embodiments, Tape Reel Turns/Spring Turns is greater than 2.5. In various embodiments, Tape Reel Turns/Spring Turns is greater than 3.0.

In specific embodiments, the gear reduction of gear train 30 and the tape reel turn to spring turn ratio is determined by determining the number of rotations that the tape reel 20 and experienced during full extension of tape blade 18 (i.e., extension from the fully retracted position to the fully extended position), determining the number of times an end of the spring 24 circles around the post 22 from a fully relaxed position (i.e., in which the spring 24 is not pretensioned) to a fully retracted position (i.e., in which the tape blade 18 is fully extended or the spring 24 is fully wound against the walls of the interior reel cavity 124), and utilizing these rotations to calculate the tape reel turn to spring turn ratio. In an illustrative embodiment, Spring Turns is the number of times that the tape reel 20 can rotate between a state in which the spring 24 is wound solid around the post 22 and a state in which the spring 24 has fully unwound into the walls of the interior reel cavity 124 (e.g., assuming that the length of the tape blade 18 does not allow prevent the spring 24 to fully unwind). In general, measurement of spring turns is measured by counting the number of times that the outer end of spring 24 (that is coupled to spring spool 26) rotates around post 22 to coil the spring 24 around the post 22 in the fully retracted position. As will generally be understood, given a particular torque profile of spiral spring 24 the number of turns experienced by spiral spring 24 may vary at different points during tape extension (e.g., the relation is non-linear for some spring designs), and thus, by calculating the tape reel turn to spring turn ratio based on the turns experienced to achieve full extension, a consistent measure of the operation of gear train 30 is provided.

As will generally be understood, given a particular torque profile of spiral spring 24 the number of turns experienced by spiral spring 24 may vary at different points during tape extension (e.g., the relation is non-linear for some spring designs), and thus, by calculating the tape reel turn to spring turn ratio based on the turns experienced to achieve full extension, a consistent measure of the operation of gear train 30 is provided.

Applicant has found that by providing gear reduction between tape reel 20 and spiral spring 24, the torque/energy of spiral spring 24 can provide a desired level of torque while decreasing the total length of spiral spring 24. In specific embodiments, by reducing the total length of spiral spring 24, the diameter of spiral spring 24 and of spring spool 26 can be reduced, relative to spiral springs 24 with similar torque/energy in tape measures that do not utilize gear reduction as discussed herein. This reduction allows for a more compact tape measure for a given tape length than believed achievable with prior tape measure and spiral spring designs.

Figure 3:
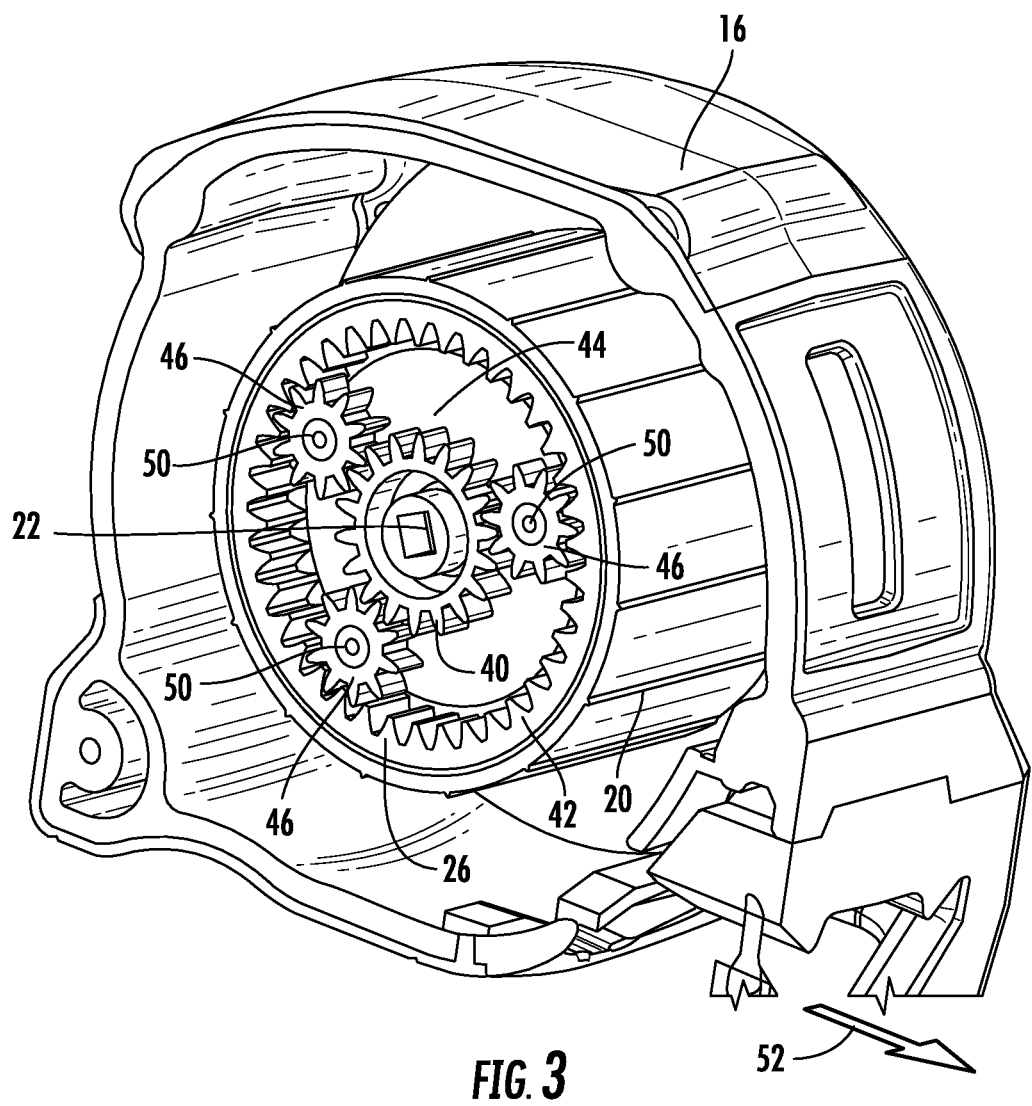
FIG. 3 is a partial cut-away view of the tape measure of FIG. 1 showing a gear train, according to an illustrative embodiment.

In addition to spring length reduction, Applicant has developed spring and gear train arrangements positioned within housing 12 and/or relative to various components of tape measure 10 (e.g., relative to post 22, spring 24, tape reel 20, spring spool 26, etc.) that further provide a compact tape measure design. In one such compact design, as shown in FIG. 3, gear train 30 is positioned such that one or more component of gear train 30 surrounds, rotates around or is co-axial with the axis of rotation of tape reel 20 and/or with the winding axis of spring 24. Specifically, gear train 30 is positioned such that one or more component of gear train 30 surrounds, rotates around or is co-axial with post 22. In addition, the components of gear train 30 are located within and surrounded by tape reel 20 and/or spring spool 26.

Further, as shown best in FIG. 10, spiral spring 24 and gear train 30 are positioned in the widthwise direction of tape measure 10 to provide for a compact tape measure. For example, as shown in FIG. 10, at least one gear of gear train 30 is positioned underneath/within tape reel 20 and/or tape blade 18 such that at least one gear of gear train 30 is at least partially surrounded by tape reel 20 and/or tape blade 18 in the radial direction of tape reel 20 (i.e., the vertical direction in the orientation of FIG. 10). In a specific embodiment, all of the gears of gear train 30 are positioned underneath/ within tape reel 20 and/or tape blade 18 such that all of the gears of gear train 30 are at least partially surrounded by tape reel 20 and/or tape blade 18 in the radial direction of tape reel 20.

Similarly, as shown in FIG. 10, tape reel 20 defines a radially outward facing surface 120 and a radially inward facing surface 122. Outward facing surface 120 is the surface of reel 20 around which tape blade 18 is wound, and inward facing surface 122 defines an interior reel cavity 124 within which spiral spring 24 (and spring spool 26) are received. As shown in FIG. 10, spiral spring 24 is positioned at least partially within interior reel cavity 124 and is also at least partially surrounded by tape reel 20 and/or tape blade 18 in the radial direction of tape reel 20 (i.e., the vertical direction in the orientation of FIG. 10). In a specific embodiment, all of spiral spring 24 is positioned within interior reel cavity 124 and is surrounded by tape reel 20 and/or tape blade 18 in the radial direction of tape reel 20. In such embodiments, no portion of spiral spring 24 extends in the width direction past the lateral most edges of tape blade 18 and/or of tape reel 20. Applicant believes that, in contrast to at least some prior tape measure designs, by fitting both gear train 30 and spiral spring 24 within tape reel 20 and/or within tape blade 18, a tape measure with a compact width dimension is provided while still providing the desired level of spring torque for tape blade retraction.

Still referring to FIG. 10, in the specific embodiment shown, spring spool 26 includes a radially inward facing surface 126 that defines an interior spring spool cavity 128. In this arrangement, spring spool 26 is at least partially received within spring spool cavity 128, and spiral spring 24 is at least partially located within spring spool cavity 128. In a specific embodiment, spiral spring 24 is located entirely within spring spool cavity 128 such that no portion of spiral spring 24 extends laterally (e.g., in the width direction) past the lateral edges of spring spool 26.

Referring primarily to FIGS. 1 and 3, details of gear train 30 are shown and described, and as shown in FIG. 3, the left end wall 48 (in the orientation of FIG. 1) of tape reel 20 is removed to show the components of gear train 30 fully assembled. Gear train 30 includes a central or sun gear 40, an outer ring gear 42, a gear carrier 44 and at least two planetary gears 46.

Figure 2:
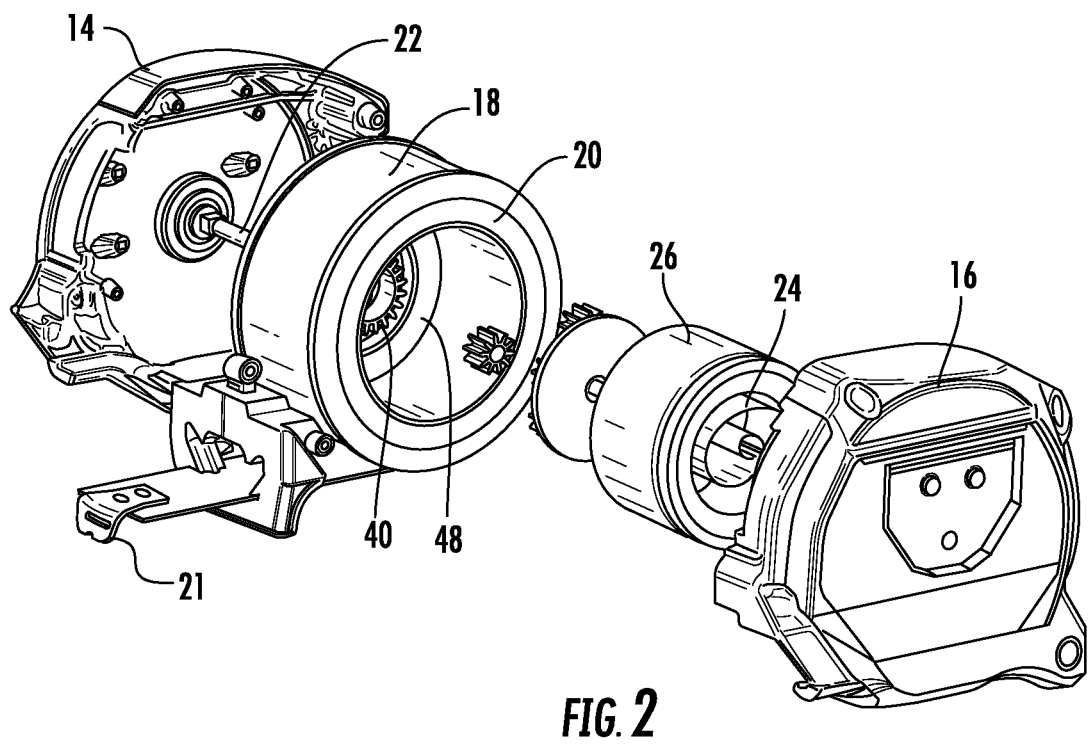
FIG. 2 is a second exploded view of the tape measure of FIG. 1, according to an illustrative embodiment.

As shown best in FIGS. 2 and 3, sun gear 40 is rigidly coupled to tape reel 20, and outer ring gear 42 is rigidly coupled to spring spool 26. In the specific embodiment shown, sun gear 40 is a gear structure that extends inward from an inner surface of left end wall 48 of tape reel 20, and outer ring gear 42 is formed from gear teeth extending radially inward from an inner, generally cylindrical surface of spring spool 26. In some such embodiments, sun gear 40 and tape reel 20 are integrally formed from a single, contiguous and continuous piece of material, and ring gear 42 and spring spool 26 are integrally formed from a single, contiguous and continuous piece of material. In such embodiments, Applicant has found that by integrally forming these components of gear train 30 with certain components of tape measure 10 the complexity and/or size of gear train 30 can be reduced.

Planetary gears 46 are rotatably mounted to posts 50 of gear carrier 44 and are located in between sun gear 40 and ring gear 42 in the radial direction. As will be understood, planetary gears 46 translate rotational movement between tape reel 20 and spring spool 26, and at least one of sun gear 40 and ring gear 42 rotates in a path around center post 22. In such embodiments, at least one of the sun gear 40 and ring gear 42 is rigidly coupled to tape reel 20. As used herein, rigidly coupled refers to components coupled together such that relative rotation between the components does not occur.

Specifically, referring to the orientation in FIG. 3, during extension of tape 18 in the direction of arrow 52, tape reel 20 spins in the counterclockwise direction around post 22, and similarly sun gear 40 (which is rigidly connected to tape reel 20) spins in the counterclockwise direction around post 22. Gear carrier 44 is mounted to post 22 via the rotationally fixed engagement between the square opening 54 at the center of gear carrier 44, and the square outer perimeter shape of post 22 prevents rotation of gear carrier 44 on post 22, which in turn allows gear train 30 to operate as discussed herein. Thus, counterclockwise rotation of sun gear 40 drives rotation of planetary gears 46 in the clockwise direction around each post 50. Rotation of planetary gears 46 drives rotation of ring gear 42 in the clockwise direction around post 22, and due to the rigid coupling between ring gear 42 and spring spool 26, spring spool 26 is also rotated in the clockwise direction around post 22.

Due to the coupling between a first/inner end of spiral spring 24 to post 22 and between a second/outer end of spiral spring 24 and spring spool 26, rotation of spring spool 26 driven by gear train 30 causes winding of spring 24 around post 22, thereby storing energy within spiral spring 24. In a specific embodiment, the second/outer end of spiral spring 24 is mechanically fastened to the inner surface of the outer wall of spring spool 26. As will be generally understood, when tape 18 is released following extension (e.g., following release of a brake mechanism), spiral spring 24 unwinds, driving the rotation of the components of gear train 30 in directions opposite of those discussed above regarding tape extension, which in turn drives tape reel 20 to rotate in the clockwise direction winding tape blade 18 onto tape reel 20.

It should be understood that in other embodiments, gear train 30 can be arranged in a variety of different ways to provide the size reduction and gear reduction discussed herein. In such embodiments, spring spool 26 and therefore ring gear 42 is rigidly fixed relative to tape housing 12, and center post 22 is rotationally coupled to housing 12. In such embodiments, the gear carrier supporting planetary gears 46 moves in a path between ring gear 42 and sun gear 40 as center post 22 rotates, thereby winding spring 24 from its inner end coupled to center post 22.

As noted above, Applicant has determined a number of metrics related to or measuring the compactness of a tape measure. As discussed herein, utilizing these metrics of tape measure compactness, Applicant is able to demonstrate that the designs discussed herein allow for more compact tape measures, for a given tape blade length, than believed achievable with prior tape measure designs. Applicant believes that these high levels of compactness are achieved without sacrificing retraction performance. In addition, it should be understood that while the tape measure compactness metrics will be discussed in reference to tape measure 10 utilizing planetary gear train 30, the highly compact tape measures discussed herein are not limited to tape measures that utilize planetary gear train 30 and may be achieved utilizing various other tape measure designs that may be developed in light of the teachings contained herein. For example, the turn reduction mechanism of tape measure 10 may also include one or more pulleys, a motor (such as an electric motor), or other turn reducing component, and these components may be utilized either alone or in combination with a reduction gear train.

In various embodiments discussed herein, a compact, high torque spring, such as spiral spring 24, is used to provide retraction to tape measure 10. In such designs, the spring of the tape measures discussed herein provide the additional torque through a spring that is more rigid but shorter in length than the spring of conventional tape measures. Applicant has found that such a design provides sufficient retraction force while allowing the spring to occupy a smaller volume within the tape measure, which in turn allows for a more compact tape measure for a tape of a given length.

Applicant has determined that one way the degree of compactness can be measured is by evaluating the length of tape blade 18, TL, relative to the total length of the retraction spring(s) (e.g., spring 24), SL, for a given tape measure. As used herein, TL is the maximum length of tape blade 18 that can be extended from tape housing 12. SL is the total linear length of the spring(s) utilized to drive retraction of tape reel 20. Regarding SL, in the context of a spiral spring, such as spring 24, SL is the total linear length of the metal material of the spring measured between the inner end at coupled to center post 22 and the outer end coupled to spring spool 26, and is equal to the length of the straight strip of metal from which the spiral spring is formed. In some instances, SL may be referred to as the "active length" of the spring. In the context of tape measure design with more than one spring (e.g., multiple spiral springs), SL is the linear length of one of the spiral springs that drive retraction of tape reel 20.

In specific embodiments, the ratio of TL/SL is greater than 2.52, specifically is between 3 and 15, and more specifically is between 3.3 and 6. In some embodiments, TL/SL is greater than 3, greater than 3.7, greater than 4, greater than 5. In specific embodiments, TL is between 6 feet and 50 feet, and SL is between 5.3 feet and 22.7 feet. In specific embodiments, TL is between 15 ft. and 40 ft., and in even more specific embodiments, TL is 35 ft., is 30 ft., is 25 ft., or is 16 ft. In a specific embodiment, tape measure 10 is a 25 foot tape measure in which TL is 25 ft. having a TL/SL ratio of 3.36-3.73. In a specific embodiment, tape measure 10 is a 35 foot tape measure in which TL is 35 ft. having a TL/SL ratio of 4-4.5, and specifically of 4.3. In a specific embodiment, tape measure 10 is a 40 foot tape measure in which TL is 40 ft. having a TL/SL ratio of 4.67-5.84. In a specific embodiment, tape measure 10 is a 50 foot tape measure in which TL is 50 ft. having a TL/SL ratio of 13-16, specifically of 14 to 15, and more specifically of 14.74.

The TL/SL ratios in prior art commercial tape measure designs that Applicant is aware of are between 1.26-2.52 including single-spring designs and multi-spring designs in which SL is the sum of the length of the multiple springs. The TL/SL ratios in prior art commercial multi-spring-in-series tape measure designs that Applicant is aware of are between 3.02-3.64 where SL is the length of one of the springs.

In some embodiments, tape measure 10 includes a plurality of springs, and SL is the length of one of the plurality of springs. In another embodiment, the tape measure 10 includes a plurality of springs, and SL is the summed total spring length, SL, and the tape blade 18 has a maximum extended length, TL, wherein TL/SL is greater than 1.75.

In various embodiments, the level of torque provided by spring 24 is provided by a thicker metal material forming spring 24, rather than increased length, and in such embodiments, the degree of compactness of tape measure 10 can be measured by evaluating the thickness of the metal material of spring 24 relative to the thickness of the metal material of tape blade 18. As shown in FIG. 11, in some embodiments, tape blade 18 has a metal core 130 and a coating layer, such as a polymer coating layer 132. Metal core 130 of tape blade 18 has an average thickness, TT. As shown in FIG. 10, spring 24 has an average thickness, ST. In various embodiments, because spring 24 is thicker (and therefore more rigid) than typical tape measure springs, the ratio of TT/ST of tape measure 10 is lower than typical tape measures. In various embodiments, TT/ST is less than 0.72, specifically is between 0.1 and 0.7 and more specifically is 0.43 to 0.61. In various embodiments, TT/ST is less than 0.73, is less than 0.70, is less than 0.70, is less than 0.60, is less than 0.50, is less than 0.40, is less than 0.30, is less than 0.20, or is less than 0.10.

In a specific embodiment, tape measure 10 is a 25 foot tape measure in which TL is 25 ft. having a TT/ST ratio of 0.55-0.64. In a specific embodiment, tape measure 10 is a 35 foot tape measure in which TL is 35 ft. having a TT/ST ratio of 0.4-0.45, and specifically of 0.43. In a specific embodiment, tape measure 10 is a 40 foot tape measure in which TL is 40 ft. having a TT/ST ratio of 0.4-0.45, and specifically of 0.43. In a specific embodiment, tape measure 10 is a 50 foot tape measure in which TL is 50 ft. having a TT/ST ratio of 0.3-0.35, and specifically of 0.33.

The TT/ST ratios in prior art single-spring commercial tape measure designs that Applicant is aware of are between 0.88-1.15. The TT/ST ratios in prior art multi-spring commercial tape measure designs that Applicant is aware of are between 0.73-0.76.

In various embodiments, tape blade 18 has an average tape width, TW. In various embodiments TW is greater than 10 mm, specifically is greater than 13 mm and specifically is 13-32 mm. Applicant believes that tape measure 10, utilizing the designs discussed herein, are compact despite having a relatively high width tape blade and easy to read tape blade 18, and spring 24 is capable of tape retraction, even of the relatively wide tape blade, despite its small size. Thus, the tape measure embodiments discussed herein provide a high level of compactness (as measured by one or more of the compactness metrics discussed herein) while providing a spring with sufficient torque to retract a relatively wide (e.g., 13-32 mm) tape blade. This is in contrast to some compact tape measures that provide a compact housing by using a very narrow tape blade.

As will generally be understood, the stiffness and therefore torque applied by spring 24 is not only a function of spring thickness, ST, but also of spring width. Accordingly, the compactness of tape measure 10 can be evaluated by comparing the average cross-sectional area, TA, of metal core 130 of tape blade 18 to the average cross-sectional area, SA, of spring 24 (e.g., average spring width times average spring thickness). In various embodiments because spring 24 is thicker and/or wider than conventional tape measure springs, the ratio of TA/SA is less than that of conventional tape measure springs. In various embodiments, TA/SA is less than 0.9, specifically is less than 0.75, and more specifically is between 0.4 and 0.65.

In the case of a tape measure with multiple springs coupled in parallel, SA is the sum of the cross-sectional area of all of the springs, but in the case of a tape measure with multiple springs coupled in series, SA is the cross-sectional area of one of the springs. In various embodiments, TA/SA is less than 0.98, less than 0.7, less than 0.6 and less than 0.5. In a specific embodiment, tape measure 10 is a 25 foot tape measure in which TL is 25 ft. having a TA/SA ratio of 0.42-0.63. In a specific embodiment, tape measure 10 is a 35 foot tape measure in which TL is 35 ft. having a TA/SA ratio of 0.4-0.5, and specifically of 0.47. In a specific embodiment, tape measure 10 is a 40 foot tape measure in which TL is 40 ft. having a TA/SA ratio of 0.4-0.5, and specifically of 0.46. In a specific embodiment, tape measure 10 is a 50 foot tape measure in which TL is 50 ft. having a TA/SA ratio of 0.2-0.3, and specifically of 0.27.

The TA/SA ratios in prior art single-spring commercial tape measure designs that Applicant is aware of are between 0.98-1.55. The TA/SA ratios in prior art multi-spring-in-series commercial tape measure designs that Applicant is aware of are between 1.28-1.35 when SA is the cross-sectional area of one of the springs. The TA/SA ratios in prior art multi-spring-in-series commercial tape measure designs that Applicant is aware of are between 0.64-0.68 when SA is the sum of the cross-sectional areas of each spring.

As will be generally understood, the moment of inertia of metal core 130 of tape blade 18 and of spring 24 is related to the thickness cubed (and the width), and as such the ratio of the moment of inertia of metal core 130 of tape blade 18, MIT, and the moment of inertia of spring 24, MIS, provides an indication of the compactness of tape measure 10. In various embodiments, MIT/MIS is less than 0.68, specifically is less than 0.3, and more specifically is between 0.09 and 0.22. In various embodiments, MIT/MIS is less than 0.8, is less than 0.73, is less than 0.70, is less than 0.70, is less than 0.60, is less than 0.50, is less than 0.40, is less than 0.30, is less than 0.20, or is less than 0.10. In specific embodiments, moment of inertia is calculated by assuming that both the spring and the tape blade, when flat, are operating as a rectangular beam. The equation used is $I \approx (w \cdot t^3)/12$, where I is the moment of inertia, w is the width of the beam, and t is the thickness of the beam.

The MIT/MIS ratios in prior art commercial tape measure designs that Applicant is aware of are between 0.80-1.85. The MIT/MIS ratios in prior art multi-spring commercial tape measure designs that Applicant is aware of are between 0.69-0.79.

Figure 12:
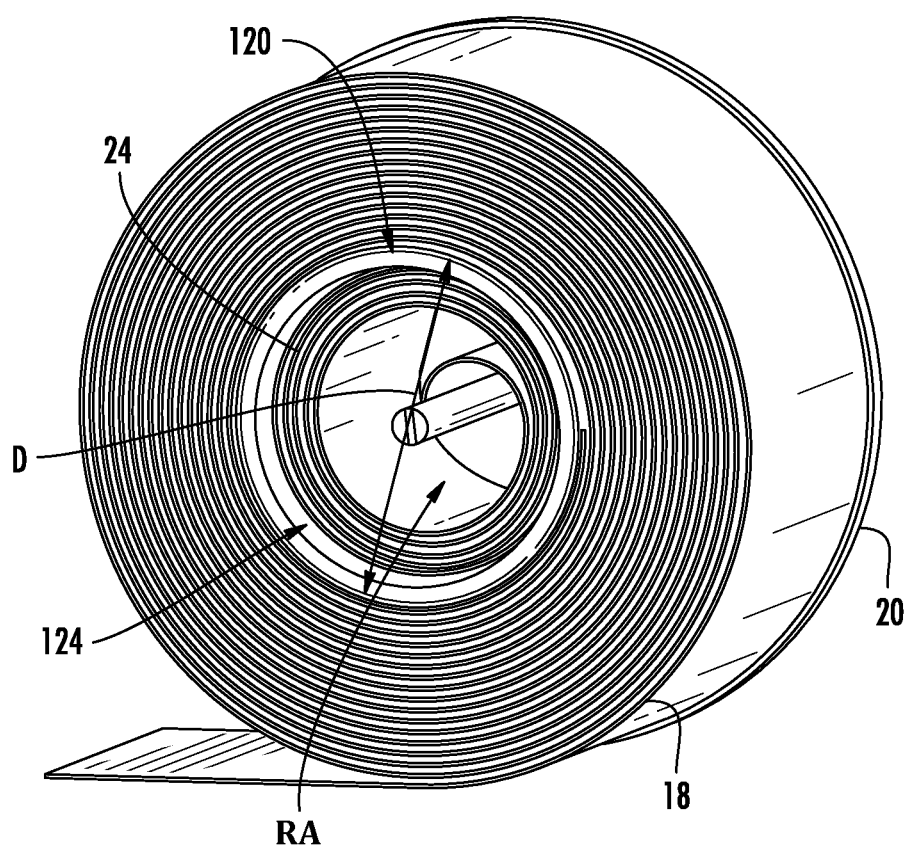
FIG. 12 is a perspective view of the tape blade, tape reel and spiral spring of the tape measure of FIG. 1, according to an illustrative embodiment.

Referring to FIGS. 10 and 12, because spring 24 has a lower length than conventional tape measure springs, interior reel cavity 124, which is sized to hold spring 24, is smaller than in standard tape measure designs for a given tape length. The size of interior reel cavity 124 can be measured in a variety of ways relevant to evaluating the compactness of tape measure 10. As shown in FIGS. 10 and 12, the size of interior reel cavity 124 is related to the minor diameter, D, of tape reel 20 that is measured across opposing portions of radially outward facing surface 120. Similarly, as can be seen in FIG. 12, the size of interior reel cavity 124 is related to the cross-sectional area, RA, of the region within tape reel 20 that is located within radially outward facing surface 120.

In various embodiments, the compactness of tape measure 10 can be evaluated by comparing the length of tape blade 18, TL, to the diameter, D, of surface 120 of tape reel 20. In various embodiments, TL/D is greater than 165 and in one such embodiment, there is only a single, retraction spiral spring located within tape reel 20. In some embodiments, TL/D is greater than 196. In a specific embodiment, tape measure 10 is a 25 foot tape measure in which TL is 25 ft. having a TL/D ratio of greater than 165, and specifically 194.59-213.19. In a specific embodiment, tape measure 10 is a 35 foot tape measure in which TL is 35 ft. having a TL/D ratio of 240-250 and specifically of about 243.29. In a specific embodiment, tape measure 10 is a 40 foot tape measure in which TL is 40 ft. having a TL/D ratio of 265-275, and specifically of about 271.38. In a specific embodiment, tape measure 10 is a 50 foot tape measure in which TL is 50 ft. having a TL/D ratio of 455-465, and specifically of about 460.38.

Prior art, single spring, 25 foot commercial tape measure designs that Applicant is aware of have a TL/D ratio between about 157.95-164.62. One prior art commercial tape measure design that Applicant is aware of has a TL/D ratio of 194.80 (25 foot)-236.77 (35 foot), but this prior art tape measure includes two spiral retraction springs, coupled in series, driving retraction of the tape reel. A prior art 40 foot commercially available tape measure has a TL/D ratio of 217.33.

In some embodiments, TL is less than 29 feet, and specifically is less than 27 feet. In various embodiments, TL/D is greater than 195. In various embodiments, TL/D is greater than 237. In various embodiments, TL/D is greater than 240. In various embodiments, TL/D is less than 250.

In various embodiments, the compactness of tape measure 10 can be evaluated by comparing the length of tape blade 18, TL, to the area, RA, within surface 120 of tape reel 20. In various embodiments, TL/RA is greater than 5 and in one such embodiment, there is only a single, retraction spiral spring located within tape reel 20. In some embodiments, TL/RA is greater than 6.2, and in some such embodiments, tape measure 10 includes a single spring. In various embodiments, TL/RA is greater than 6.6. In various embodiments, TL/RA is greater than 6.6, greater than 6.7, or greater than 7. In various embodiments, TL/RA is less than 7 or is less than 7.5. In a specific embodiment, tape measure 10 is a 25 foot tape measure in which TL is 25 ft. having a TL/RA ratio of 6.18-7.42. In a specific embodiment, tape measure 10 is a 35 foot tape measure in which TL is 35 ft. having a TL/RA ratio of 6.7-7.2, and specifically of 6.95. In a specific embodiment, tape measure 10 is a 40 foot tape measure in which TL is 40 ft. having a TL/RA ratio of 6.2-67, and specifically of 6.58. In a specific embodiment, tape measure 10 is a 50 foot tape measure in which TL is 50 ft. having a TL/RA ratio of 15-20, and specifically of 17.5.

embodiments, tape measure housing 12 has a maximum width (the horizontal dimension shown in FIG. 10) of 45 mm-63 mm, a maximum height (the vertical dimension shown in FIG. 10) of 69 mm-103 mm, and a maximum length (the dimension perpendicular to both the width and the height) of 78 mm-110 mm. In one embodiment, tape blade 18 has a maximum extended length, TL, of 25 feet, and housing 12 has a width of 45 mm to 63 mm, a height of 69 mm to 89 mm, and a length of 78 mm to 96 mm. In one embodiment, tape blade 18 has a maximum extended length, TL, of 35 feet, and housing 12 has a width of 45 mm to 63 mm, a height of 79 mm to 101 mm, and a length of 89 mm to 110 mm.

The various dimensions of various illustrative embodiments of tape measure 10 developed by Applicant are shown in Table 1 below.

TABLE 1

| Dimension/Parameter | Tape Measure Design 1 | Tape Measure Design 2 | Tape Measure Design 3 | Tape Measure Design 4 | Tape Measure Design 5 |
|---|---|---|---|---|---|
| Tape Length (TL) (ft.) | 25.6 | 25.6 | 35.6 | 25.6 | 40.6 |
| Spring Length (SL) (mm) | 2321 | 2089 | 2526 | 2324 | 2120 |
| Tape Steel Thickness (TT) (mm) | 0.11 | 0.11 | 0.11 | 0.11 | 0.11 |
| Spring Thickness (ST) (mm) | 0.18 | 0.2 | 0.255 | 0.22 | 0.255 |
| Tape Reel Minor Diameter (D) (mm) | 36.6 | 36.6 | 44.6 | 40.1 | 45.6 |
| Tape Reel Minor Area (RA) (mm$^2$) | 1052.1 | 1052.1 | 1562.3 | 1262.9 | 1633.1 |
| Tape Cross-Sectional Area (TA) (mm$^2$) | 2.97 | 2.97 | 2.97 | 2.97 | 3.52 |
| Spring Cross-Sectional Area (SA) (mm$^2$) | 6.3 | 7.0 | 6.375 | 5.5 | 7.65 |
| Tape Moment of Inertia (MIT) (mm$^4$) | 0.003 | 0.003 | 0.003 | 0.003 | 0.0035 |
| Spring Moment of Inertia (MIS) (mm$^4$) | 0.017 | 0.0233 | 0.0345 | 0.0222 | 0.0415 |
| Tape Reel Turns to Spring Reel Turns | 1.95 | 2.29 | 3.18 | 2.36 | 3.55 |

The TL/RA ratio in prior art, single spring, commercial tape measure designs that Applicant is aware of are between about 3.08 and 5.00. One prior art commercial tape measure design that Applicant is aware of has a TL/RA ratio of 6.22 (25 foot)-6.6 (35 foot), but this prior art tape measure includes two spiral retraction springs, coupled in series, driving retraction of the tape reel.

Referring to FIG. 11, in contrast to some prior tape designs that utilize gearing (e.g., long-length, e.g., greater than 50 ft., flat tapes, crank-based manual retraction tapes, etc.), in at least some embodiments, the compact designs discussed herein are provided in tape measures having highly robust, high standout, concave/convex metal tape blades. As shown in FIG. 11, tape blade 18 generally and both metal core 130 and polymer coating 132 generally define upper surfaces having a concave profile shape and/or lower surfaces having a convex profile shape. This shape generally provides for increased tape blade rigidity and tape blade standout and, in some embodiments, distinguishes tape measure 10 from very long tapes or manual crank type tape measures that have flat measuring tape blades. In specific embodiments, tape blade 18 has a standout (e.g., the length of tape that is self-supporting when extended from tape housing 12) of at least 4 feet, or at least 6 feet, or of at least 8 feet. In addition, tape blade 18 has one or more ink or marking layer 134 located between the outer surfaces of metal core 130 and polymer coating 132 that provides the various tick marks and measurement numerals on tape blade 18.

In specific embodiments, because of the compact nature of spring 24 as discussed herein the dimensions of tape measure housing 12 are compact as compared to tape measures having a tape blade of a given length. In specific In various embodiments, metal core 130 of tape blade 18 is formed from a steel material, and spring 24 is formed from a steel material. In various embodiments, metal core 130 and/or spring 24 are formed from an alloyed spring steel, alloyed high strength steel, etc. In one embodiment, the steel of metal core 130 and/or spring 24 is of a hardness between 50-54 RHC. In another embodiment, the steel inner core 130 and/or spring 24 is of a hardness between 45-60 RHC. In specific embodiments, polymer coating 132 is a nylon material, and in specific embodiments, coating 132 may be applied as a laminate, nylon extrusion, film attached with adhesive, or a powder/spray on coating.

Figure 4:
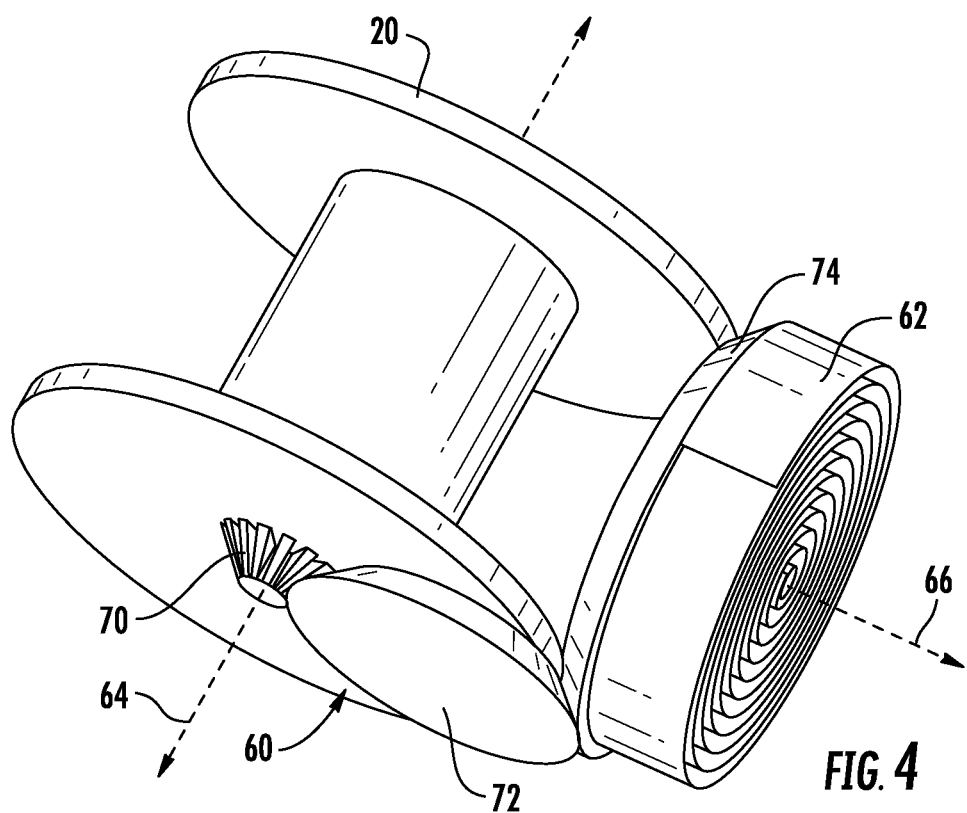
FIG. 4 is a perspective view of a tape measure reel and retraction system including a gear train, according to another illustrative embodiment.
Figure 5:
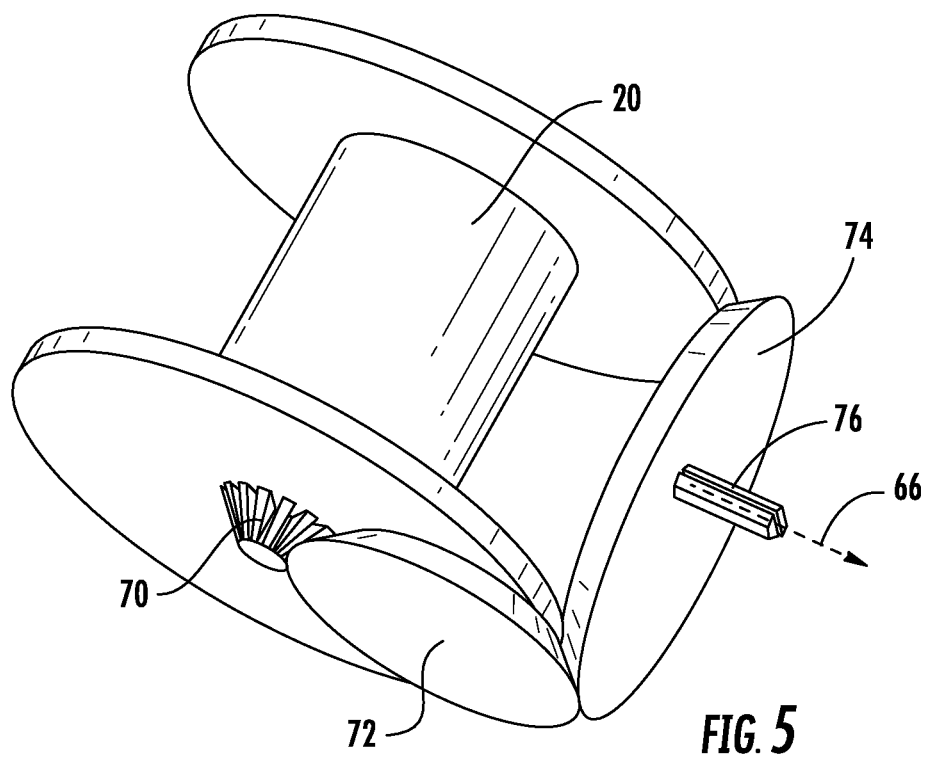
FIG. 5 is a perspective view of the tape measure reel and retraction system of FIG. 4 with the spiral spring removed, according to an illustrative embodiment.

Referring to FIGS. 4 and 5, a tape measure reel and a retraction system are shown according to another illustrative embodiment. In general, the retraction system of FIGS. 4 and 5 is an alternative mechanism that may be included in tape measure 10. In this embodiment, a gear train 60 is coupled between tape reel 20 and a spiral spring 62. In various embodiments (and similar to gear train 30), gear train 60 provides gear reduction between tape reel 20 and spiral spring 62 such that each rotation of tape reel 20 results in less than one rotation of spiral spring 62. In various embodiments, the gear reduction provided by gear train 60 is at least 2 to 1, and specifically is 3 to 1 or greater. In a specific embodiment, the gear reduction provided by gear train 60 is between 3 and 4 to 1, and specifically is 3.2 to 1.

In addition, gear train 60 is configured to change the direction of the rotational movement of tape reel 20 in order to wind spiral spring 62 which does not reside within tape reel 20. As shown in FIG. 4, tape reel 20 defines a rotational axis 64 about which tape reel 20 rotates during extension and retraction, and spiral spring 62 defines rotational axis 66 about which spring 62 is wound during tape extension. In various embodiments, gear train 60 is configured such that tape reel rotational axis 64 and spring rotational axis 66 are not parallel to each other, and in a specific embodiment, tape reel rotational axis 64 and spring rotational axis 66 are perpendicular to each other. The relative positioning of tape reel 20 and spring 62 provided by gear train 60 allows for the overall height of the tape measure 10 incorporating this retraction mechanism to be lower than tape measures in which the rotational axes of the tape reel and spring are parallel or in which the spiral spring is located within tape reel 20.

In specific embodiments, gear train 60 includes first gear 70 rigidly coupled to tape reel 20 and includes gear teeth surrounding rotational axis 64. First gear 70 engages and drives a first bevel gear 72, which in turn engages and drives a second bevel gear 74. As shown in FIG. 5, second bevel gear 74 is located perpendicular to first bevel gear 70 and includes a central post 76. An inner end of spiral spring 62 is coupled to post 76, and an outer end of spiral spring 62 is coupled to a fixed position relative to the housing of the associated tape measure. In this arrangement, central post 76 is rigidly fixed to second bevel gear 72 such that post 76 defines spring rotational axis 66. As second bevel gear 74 is driven by tape reel 20 through gears 70 and 72, second bevel gear 74 and post 76 rotates which in turn winds spiral spring 62 during tape extension. Upon release of the tape, spring 62 drives reel 20 through gears 74, 72 and 70 driving retraction of the tape blade onto tape reel 20.

Referring to FIGS. 6-9, various embodiments of tape measure 10 including a compression spring based retraction system are shown and described. In one illustrative embodiment shown in FIGS. 6 and 7, tape measure 10 includes a retraction system 80, and retraction system 80 includes a compression spring (e.g., an axial compression spring, a helical compression spring, a wave spring, leaf spring, conical shaped springs, hourglass-shaped springs, barrel-shaped springs, etc.), shown as helical compression spring 82, and a system for transmitting rotational movement of tape reel 20 (e.g., during tape extension) to non-rotational (e.g., axial) compression of spring 82. In such embodiments, Applicant believes that for a tape blade of a given size or for a spring of a given energy level, use of retraction system 80 including a compression spring allows for a more compact tape measure.

Figure 6:
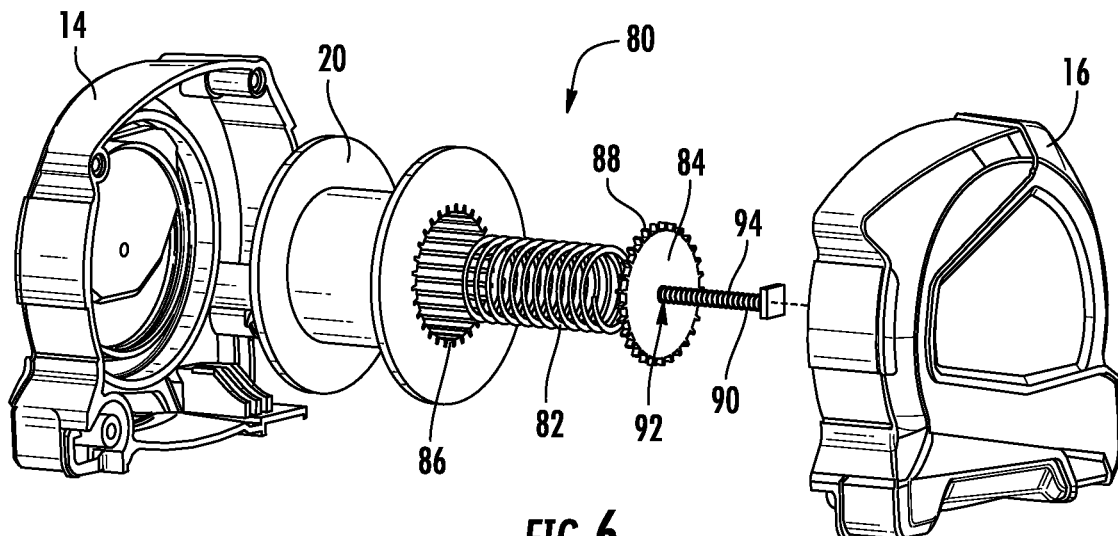
FIG. 6 is an exploded view of a tape measure, according to another illustrative embodiment.
Figure 7:
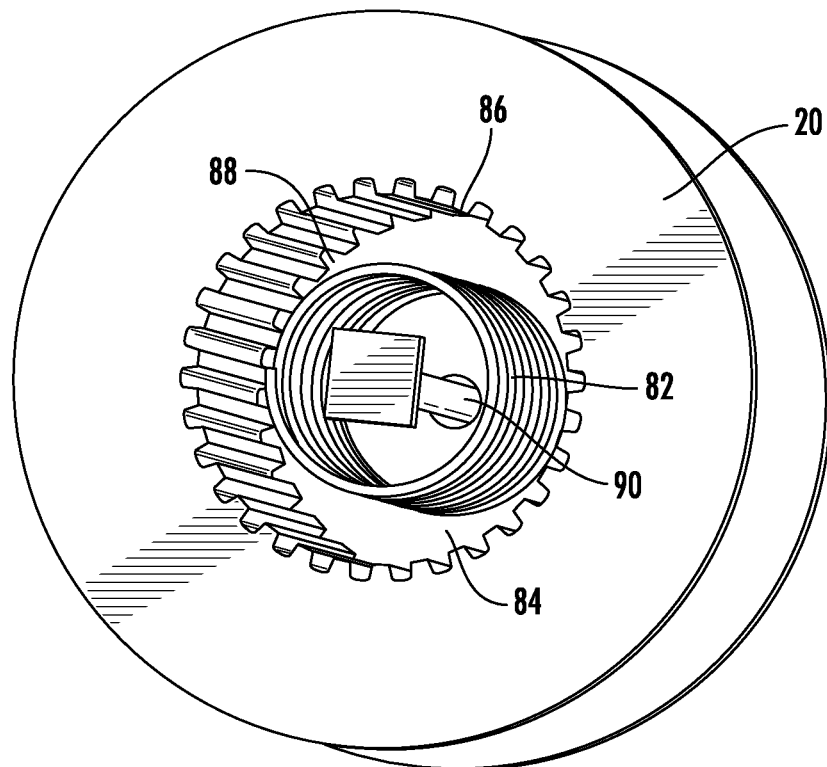
FIG. 7 is a perspective view of the tape measure reel and retraction system of the tape measure of FIG. 6, according to an illustrative embodiment.

As shown in FIGS. 6 and 7, retraction system 80 includes a plate 84 that engages one end of spring 82. The inner surface of tape reel 20 includes gear teeth 86 that engage cooperating gear teeth 88 formed on the outer perimeter of plate 84 such that rotational movement of tape reel 20 during tape extension is transferred to plate 84. Retraction system 80 includes a transmission system, shown as threaded post 90, that coverts rotational motion of tape reel 20 to axial compression of spring 82.

Plate 84 includes a threaded central opening 92 which engages threads 94 located along the outer surface of threaded post 90. As plate 84 is rotated via engagement between gear teeth 86 and 88, plate 84 moves axially, along the length of post 90 such that plate 84 compresses spring 82 during tape extension. When the tape blade (e.g., tape blade 18) is released, spring 82 expands driving the components in the opposite direction causing tape reel 20 to wind up the tape blade.

As will be understood, the thread pitch of threads 94 determines the degree of conversion between rotational movement and axial movement of plate 84. Thus, the thread pitch of threads 94 determines the degree or amount of compression experienced for each rotation of tape reel 20. Thus, in various embodiments, the pitch of threads 94 is selected to provide a desired level of spring compression, and consequently a desired level of retraction force, which in turn can limit tape whip and the potential tape damage associated with tape whip.

Figure 8:
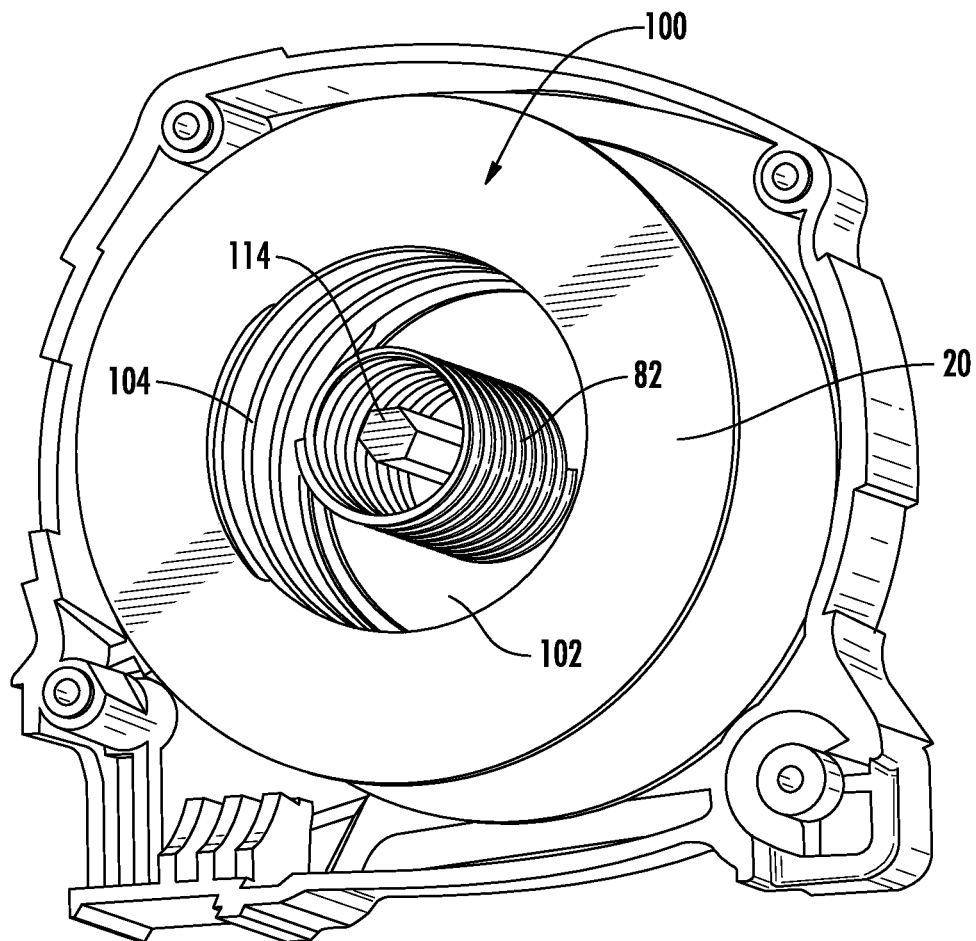
FIG. 8 is a perspective view of a tape measure reel and retraction system including a compression spring, a threaded compression plate and an internally threaded tape reel, according to another illustrative embodiment.
Figure 9:
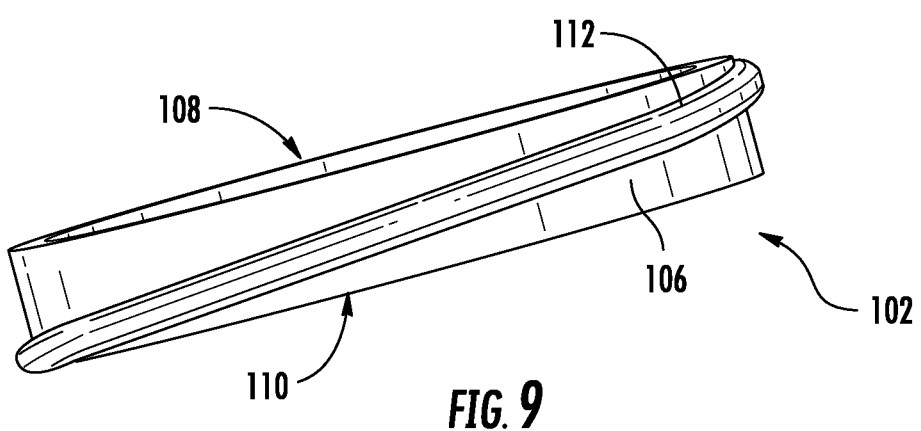
FIG. 9 is a perspective view of the threaded compression plate of FIG. 8, according to an illustrative embodiment.

Referring to FIGS. 8 and 9, another embodiment of tape measure 10 including a compression spring based retraction system, such as retraction system 100, is shown and described. In general, retraction system 100 is substantially the same as retraction system 80 discussed above, except for the differences discussed herein. Similar to system 80, retraction system 100 is configured to transmit rotational movement of tape reel 20 (e.g., during tape extension) to non-rotational (e.g., axial) compression of spring 82.

System 100 includes a compression plate 102 and threads 104 located along the internal surface of tape reel 20. Compression plate 102 includes an outer perimeter wall or sidewall 106 that extends between opposing major surfaces or faces 108 and 110. Compression plate 102 includes external threads 112 located along outer sidewall 106. In general, external threads 112 are sized to cooperate with internal threads 104 such that as reel 20 rotates (e.g., during tape extension) interaction between threads 104 and threads 112 drives plate 102 axially along shaft 114 causing spring 82 to be compressed. As will be understood, in general, plate 102 is rotatably coupled to shaft 114 such that plate 102 is permitted to rotate around shaft 114 and is also is permitted to translate along shaft 114. In specific embodiments, shaft 114 has a circular cross-section shape and is received through a circular central mounting hole in plate 102. As will be understood, once the tape blade is released, spring 82 expands against plate 102 which in turn drives rotation of tape reel 20 in the opposite direction causing the tape blade (e.g., tape blade 18) to retract and wind onto tape reel 20. In specific embodiments, shaft 114 is fixed, and as tape reel 20 spins around shaft 114 within the tape housing, plate 102 moves linearly along shaft 114.

As shown in FIGS. 8 and 9, threads 104 are recessed threads forming a helical pattern along the inner surface of tape reel 20. Threads 112 are external threads extending outward from sidewall 106 and formed in a helical pattern that matches the helical pattern of threads 104. In this manner, threads 112 ride within threads 104 as plate 102 translates along shaft 114 during tape extension and retraction.

It should be understood that the figures illustrate the illustrative embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various illustrative embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, rigidly coupled refers to two components being coupled in a manner such that the components move together in fixed positional relationship when acted upon by a force.

Various embodiments of the invention relate to any combination of any of the features, and any such combination of features may be claimed in this or future applications. Any of the features, elements, or components of any of the illustrative embodiments discussed above may be utilized alone or in combination with any of the features, elements, or components of any of the other embodiments discussed above.

What is claimed is:

1. A tape measure comprising:
   a housing;
   a shaft;
   a tape reel rotatably mounted within the housing around the shaft, the tape reel comprising a radially outward facing surface and a radially inward facing surface defining an interior reel cavity;
   an elongate tape blade wound around the radially outward facing surface of the tape reel, wherein the elongate tape blade comprises a moment of inertia, MIT;
   a spiral spring coupled between the tape reel and the shaft such that, when the elongate tape blade is unwound from the tape reel to extend from the housing, the spring stores energy and the spiral spring releases energy driving rewinding of the elongate tape blade on to the tape reel, wherein the spiral spring comprises a moment of inertia, MIS; and
   a turn differential mechanism rotatably coupling the spiral spring to the tape reel such that, during extension of the elongate tape blade from the housing, each full rotation of the tape reel is translated into less than a full rotation of the spring;
   wherein MIT/MIS is less than 0.8.

2. The tape measure of claim 1, wherein the tape measure has only one spiral spring located within the interior reel cavity.

3. The tape measure of claim 1, wherein MIT/MIS is less than 0.73.

4. The tape measure of claim 1, wherein MIT/MIS is less than 0.70.

5. The tape measure of claim 1, wherein MIT/MIS is less than 0.68.

6. The tape measure of claim 1, wherein MIT/MIS is less than 0.60.

7. The tape measure of claim 1, wherein MIT/MIS is less than 0.50.

8. The tape measure of claim 1, wherein MIT/MIS is less than 0.40.

9. The tape measure of claim 1, wherein MIT/MIS is less than 0.30.

10. The tape measure of claim 1, wherein MIT/MIS is less than 0.20.

11. The tape measure of claim 1, wherein MIT/MIS is less than 0.10.

12. A tape measure comprising:
    a housing;
    a tape reel rotatably mounted within the housing, the tape reel comprising a radially outward facing surface and a radially inward facing surface defining an interior reel cavity;
    an elongate tape blade wound around the radially outward facing surface of the tape reel; and
    a spiral spring coupled between the tape reel and the shaft such that, when the elongate tape blade is unwound from the tape reel to extend from the housing, the spring stores energy and the spiral spring releases energy driving rewinding of the elongate tape blade on to the tape reel;
    wherein the elongate tape blade comprises a metal core and a coating layer, and the metal core has an average thickness, TT, and the spiral spring has an average thickness, ST, wherein TT/ST is less than 0.73.

13. The tape measure of claim 12, further comprising a shaft and a turn reduction mechanism rotatably coupling the spiral spring to the tape reel such that, during extension of the elongate tape blade from the housing, each full rotation of the tape reel is translated into less than a full rotation of the spring.

14. The tape measure of claim 12, wherein TT/ST is less than 0.70.

15. The tape measure of claim 12, wherein TT/ST is less than 0.6.

16. The tape measure of claim 12, wherein TT/ST is less than 0.5.

17. The tape measure of claim 12, wherein TT/ST is less than 0.4.

* * * * *